United States Patent
Su et al.

(10) Patent No.: US 9,317,106 B2
(45) Date of Patent: Apr. 19, 2016

(54) AUTOMATIC CORRECTION DEVICE OF VEHICLE DISPLAY SYSTEM AND METHOD THEREOF

(71) Applicant: Automotive Research & Test Center, Changhua County (TW)

(72) Inventors: Yi-Feng Su, Changhua County (TW); Jia-Xiu Liu, Changhua County (TW); Yu-Sung Chen, Changhua County (TW)

(73) Assignee: AUTOMOTIVE RESEARCH & TEST CENTER, Changhua County (TW)

( * ) Notice: Subject to any disclaimer, the term of this patent is extended or adjusted under 35 U.S.C. 154(b) by 93 days.

(21) Appl. No.: 14/073,438

(22) Filed: Nov. 6, 2013

(65) Prior Publication Data
US 2014/0160012 A1 Jun. 12, 2014

(30) Foreign Application Priority Data
Dec. 11, 2012 (TW) .............................. 101146589 A

(51) Int. Cl.
| | |
|---|---|
| *G09G 5/00* | (2006.01) |
| *G06F 3/00* | (2006.01) |
| *G06K 9/00* | (2006.01) |

(52) U.S. Cl.
CPC ............ *G06F 3/005* (2013.01); *G06K 9/00248* (2013.01); *G06K 9/00845* (2013.01)

(58) Field of Classification Search
CPC ......... G06F 3/005; G06F 3/012; G02B 27/01; G02B 2027/0198; G02B 2027/0129; G02B 2027/0138
See application file for complete search history.

(56) References Cited

U.S. PATENT DOCUMENTS

| | | | | | |
|---|---|---|---|---|---|
| 5,677,701 | A | * | 10/1997 | Okuyama | .............. B60K 37/02 345/7 |
| 6,045,229 | A | * | 4/2000 | Tachi | ................. G02B 27/0093 345/7 |

(Continued)

FOREIGN PATENT DOCUMENTS

| | | |
|---|---|---|
| CN | 1745003 A | 3/2006 |
| CN | 201837782 U | 5/2011 |

(Continued)

OTHER PUBLICATIONS

Su et al., "The Intellectual Vehicle Safety Display System," The 17th National Conference on Vehicle Engineering, Nankai University, pp. 191-197 (Nov. 9, 2012).

*Primary Examiner* — Kent Chang
*Assistant Examiner* — Mark Edwards
(74) *Attorney, Agent, or Firm* — Muncy, Geissler, Olds & Lowe, P.C.

(57) ABSTRACT

An automatic correction device of a vehicle display system and method thereof, comprising following steps: firstly, transform an image of road in front into projection information, to calculate a coordinate model, then detect facial features of a driver, to calculate a face rotation angle and a facial features 3-D position of said driver, to estimate a position field of view for said driver looking to front. Then, said position field of view is substituted into an image overlap projection transformation formula, to generate an overlap error correction parameter. Subsequently, utilize said overlap error correction parameter to correct and update said coordinate model. Finally, utilize a display unit to project said corrected coordinate model to front of said driver, so that projection position of said coordinate model overlaps said position field of view of said driver.

16 Claims, 5 Drawing Sheets

(56) References Cited

U.S. PATENT DOCUMENTS

| | | | |
|---|---|---|---|
| 7,135,961 B1 | 11/2006 | Operowsky et al. | |
| 2002/0055808 A1 | 5/2002 | Matsumoto | |
| 2003/0169213 A1* | 9/2003 | Spero | G02B 5/20 345/7 |
| 2004/0062424 A1* | 4/2004 | Mariani | G06K 9/00228 382/118 |
| 2008/0010875 A1 | 1/2008 | Kuwabara et al. | |
| 2012/0050138 A1* | 3/2012 | Sato | B60K 35/00 345/4 |

FOREIGN PATENT DOCUMENTS

| | | |
|---|---|---|
| TW | 200742689 | 11/2007 |
| TW | M353122 U | 3/2009 |

* cited by examiner

AUTOMATIC CORRECTION DEVICE OF VEHICLE DISPLAY SYSTEM AND METHOD THEREOF

This application claims priority for Taiwan patent application no. 101146589 filed on Dec. 11, 2012, the content of which is incorporated by reference in its entity.

BACKGROUND OF THE INVENTION

1. Field of the Invention

The present invention relates to a technology of vehicle image projection display, and in particular to an automatic correction device of vehicle display system and method thereof.

2. The Prior Arts

Nowadays, with the rapid progress of science and technology, and raise of living standard, motor vehicle is getting increasingly poplar, so that every family may own its vehicles. However, along with the increase of vehicles on the road, traffic accidents happen quite often, and most of them happen due to rear-end collisions. In order to raise driving safety, Head-Up-Display (HUD) device has become a basic and standard outfit of a vehicle. For this type of device, the vehicle driving information usually displayed on an ordinary instrument panel can be projected and displayed on the windshield of a vehicle, so that in driving a vehicle, the driver may get this information by looking through the windshield, while paying attention to the road in front, without the need to lower his head to look at the instrument panel, to be distracted to cause traffic accidents, so as to raise driving safety.

Presently, the vehicle Head-Up-Display (HUD) device available on market is used mostly to display vehicle speed. More advanced version of this device could display GPS navigation information, distance to the vehicle in front, or an alarm diagram, to remind the driver if he is driving too fast, he is too close to the vehicle in front to cause accidents, or provide paths that might be taken to get to the destination for driver, so that the driver has sufficient time to take appropriate measures, such as to slow down, to avoid the traffic accidents from happening. However, the image displayed on the windshield is rather too small, such that it can only display some simple and easy information, such as vehicle speed, small arrow guidance indication, front vehicle information (for example, distance to the vehicle in front), traffic lane information (for example, traffic lane width, deviation amount), yet it can not display the real scene in an imaginary way, to give the driver an intuitive viewing effect. In addition, it can not be adjusted according to the driver's seating gesture, to be compatible with driver's field of view. In driving a vehicle, the HUD information can not be adjusted dynamically based on the position of the driver's face. Therefore, the HUD system is not capable of generating real-time projection information.

Therefore, presently, the design and performance of the HUD system is not quite satisfactory, and it has much room for improvements.

SUMMARY OF THE INVENTION

In view of the problems and shortcomings of the prior art, the present invention provides an automatic correction device of a vehicle display system and method thereof, to overcome the drawbacks and shortcomings of the prior art.

A major objective of the present invention is to provide an automatic correction device of a vehicle display system and method thereof. Wherein, image recognition technology is used to derive face information from the driver's face image, that is used in cooperation with distance detection (such as using infrared light), to obtain 3-D face position information, and to adjust coordinate position of projection, to be compatible with field of view of the driver.

Another objective of the present invention is to provide an automatic correction device of a vehicle display system and method thereof. Wherein, display illumination can be adjusted timely depending on the environment, so that the driver can view clearly the information displayed on the windshield for the field of view in front, without causing discomfort to the eyes while saving power consumption.

A further objective of the present invention is to provide an automatic correction device of a vehicle display system and method thereof. Wherein, background illumination is used to detect environment light source, to determine if it is day time or night time, without the need to install additional light sensing device, to reduce cost and system integration complexity.

In order to achieve the objective mentioned above, the present invention provides an automatic correction device of a vehicle display system and method thereof, comprising following steps: acquire a coordinate model; detect a plurality of facial features of the driver, and utilize a processing unit to calculate driver's face rotation angles and his facial features 3-D position, to estimate the position field of view for the driver looking to the front; substitute the position field of view into an image overlap projection transformation formula, to generate an overlap error correction parameter, and utilize the overlap error correction parameter to correct and update the coordinate model.

In addition, the present invention provides an automatic correction device of a vehicle display system, comprising: an information capturing unit, a processing unit, and a display unit. Wherein, the information capturing unit is used to fetch a plurality of facial features of the driver, and the distance from the face of the driver to an image capturing device. The processor is used to calculate the face rotation angle and facial features 3-D position of the driver, based on the facial features and the distance obtained by the information capturing unit, to estimate the position field of view for the driver looking to the front, and generate a overlap error correction parameter based on the position field of view, to correct the coordinate model. Moreover, the display unit projects the corrected coordinate model to the front of the driver, so that the projection position of the coordinate model superimposed with that of the driver's field of view.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

The present invention provides an automatic correction device of a vehicle display system and method thereof, so that the position of the projected information can be adjusted automatically to the position of driver's field of view according to the driver's gesture, and display illumination can be adjusted to the eye's comfort based on the background environment.

Figure 1:
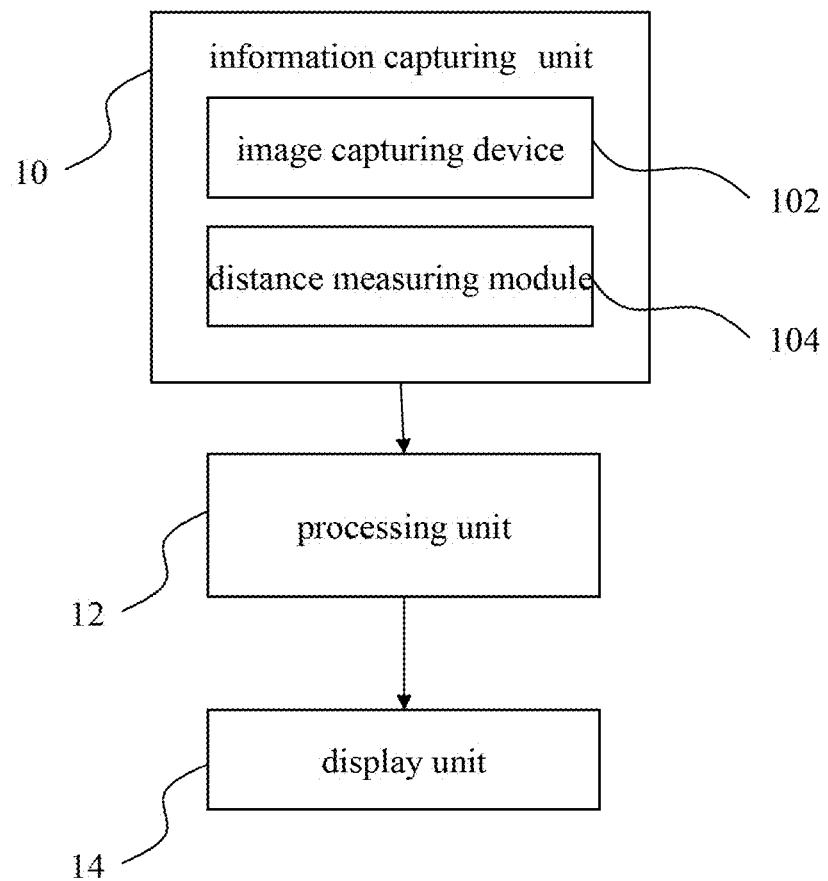
FIG. 1 is a block diagram of an automatic correction device of a vehicle display system according to the present invention.

Refer to FIG. 1 for a block diagram of an automatic correction device of a vehicle display system according to the present invention. As shown in FIG. 1, the automatic correction device of a vehicle display system includes: an information capturing unit 10, a processing unit 12, and a display unit 14. Wherein, the information capturing unit 10 includes an image capturing device 102 and a distance measuring module 104. The image capturing device 102 is used to fetch a plurality of facial features of a driver, while the distance measuring module 104 is used to detect the distance between driver's face and the image capturing device 102. The facial features are shown in images of driver's face, that include: face of the driver, positions of nose and eyes, positions of the two eyes' borders, distance between the two eyes, the relative positions of eyes and nose, and illumination of environment. Wherein, the distance measuring module 104 can be an infrared light distance measuring module. The processing unit 12 utilizes a face image recognition technology to calculate the facial features 3-D coordinates of the driver, based on the facial features and distances between them obtained by the information capturing unit 10. The facial features 3-D coordinates of the driver include: the distance between the eyes and the image capturing device 102, the height from eyes to the ground, and the face rotation angle (namely, the direction of driver's view), that are used to estimate the position field of view position for the driver looking to the front (namely, the field depth). The position field of view is used to generate an overlap error correction parameter, to correct and update a coordinate model. The display unit 14 projects the corrected coordinate model to the front of the driver, such as the windshield of the vehicle, a reflective optical film glued on the windshield, or a viewable panel, so that the position of the projected coordinate model superimposes with the position field of view of the driver. In particular, the viewable panel can be a viewable sheet of a highly reflective optical film. The display information in the coordinate model include: the traffic lane, position of the vehicle, speed limit, and other related driving information, etc.

The face rotation angle in the facial features 3-D position is obtained by the processing unit 12 based on the relative positions of nose and left and right borders of face in the facial features by means of a face image recognition technology. The distance between the eye and the image capturing device 102 is obtained through using the distance measuring module 104, and that is used to calculate the height from the eyes to the ground.

Figure 2:
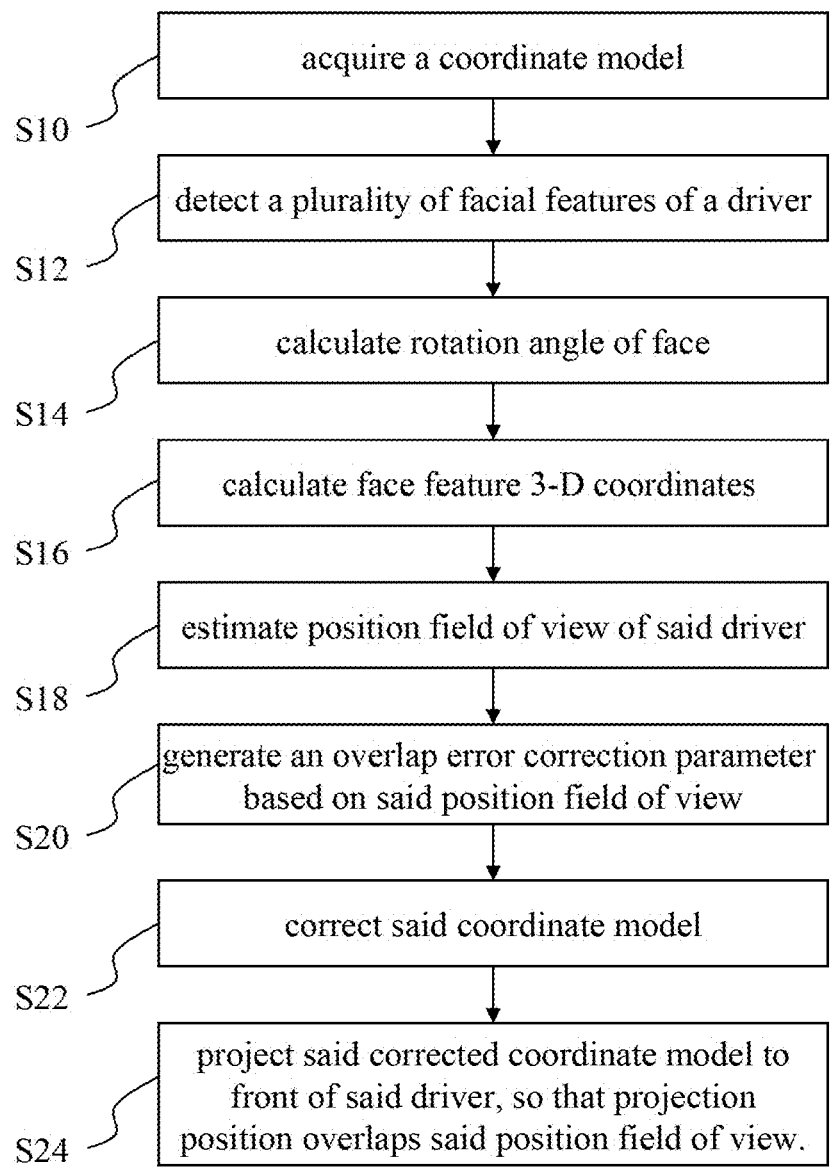
FIG. 2 is a flowchart of the steps of an automatic correction method for a vehicle display system according to the present invention.

Next, refer to FIG. 2 for a flowchart of the steps of an automatic correction method for a vehicle display system according to the present invention. As shown in FIG. 2, the automatic correction method for a vehicle display system includes the following steps. Firstly, in step S10, transform images of front road into projected display information, and calculate a coordinate model based on FIG. 5 and equation (2). The projected display information includes driving information, such as traffic lane marking, front obstacle position, and vehicle speed, and its projection position. Next, in step S12, detect facial features of the driver. Then, in step S14, calculate the deflection angle of driver's face based on the facial features. Subsequently, in step S16, calculate the distance between the eyes and the image capturing device, and the height from the eyes to the ground in the facial features 3-D position of the driver, with their values expressed as matrices $T_{WE3X1}$, $R_{WE3x3}$ in equation (2). Then, in step S18, estimate the position field of view for a driver looking to the front, with its value expressed as t in equation (2). The matrices $T_{WE3X1}$, $R_{WE3x3}$, and t are face correction parameters. Afterwards, in step S20, substitute the position field of view into an image overlap projection transformation formula, to generate an overlap error correction parameter. Then, in step S22, utilize the overlap error correction parameter to correct parameters for the coordinate model. And finally, in step S24, project the parameter-corrected coordinate model to the front of the driver, so that the projected position of the coordinate model overlaps that of the position field of view of the driver.

Figure 3A:
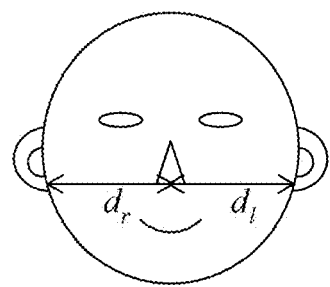
FIGS. 3A and 3B are schematic diagrams showing face rotation angle used in an automatic correction method for a vehicle display system according to the present invention.
Figure 3B:
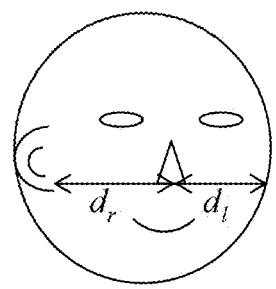

In the descriptions mentioned above, in step S14, for the estimation of the face rotation angle, refer to FIGS. 3A and 3B for schematic diagrams showing face rotation angle used in an automatic correction method for a vehicle display system according to the present invention. Wherein, FIG. 3A shows the face not deflected, while FIG. 3B shows the face deflected to the right. Since, in step S12, the relative positions of nose, and left and right borders of the face are obtained. Suppose in FIG. 3A, the distance between nose and right border of face is $d_r$, and the distance between nose and left border of the face is $d_l$, then the deflection angle of the face can be obtained through the following equation (1):

$$\text{face rotation angle} = F * \left(90° - \frac{\text{MIN}(d_l, d_r)}{d_l + d_r} * 180°\right)$$

In equation (1), F is an environment parameter (such as focal length of a camera, distance between a face and a camera). In case $d_r$ is at its minimum, the face is turned to the right; otherwise, in case $d_l$ is at its minimum, the face is turned to the left.

Since at night, the image of the face fetched tends to be blurred, therefore, the approaches of detecting face border in day time and night time are different. In day time, vertical line section is used to estimate border of face, while at night, the block of brighter background is used to estimate border of face.

Figure 4:
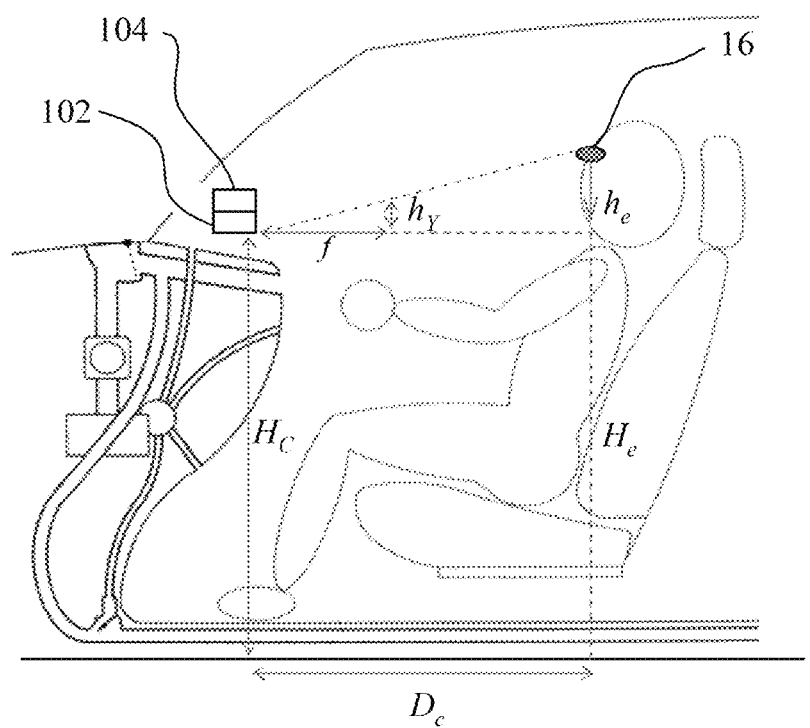
FIG. 4 is a schematic diagram showing distance between the driver and an image capturing device, and the distance from eyes of a driver to the ground according to the present invention.

In step S16, after the distance measuring module 104 obtains the distance between the eyes and the image capturing device 102, the facial features 3-D position of a driver is estimated, to calculate the distance from the eyes to the ground through utilizing the relations between similar triangles. As shown in FIG. 4, the positions of the distance measuring module 104 and the image capturing device 102 can be overlapped, to measure the distance Dc between the image capturing device 102 and the driver's eyes 16. The distance from the image capturing device 102 to the ground is Hc, while the height of the eyes 16 relative to the image capturing device 102 is $h_e = D_c * (h_y/f)$. Therefore, the height of the eyes 16 to the ground is $H_e = H_c + h_e$.

Figure 5:
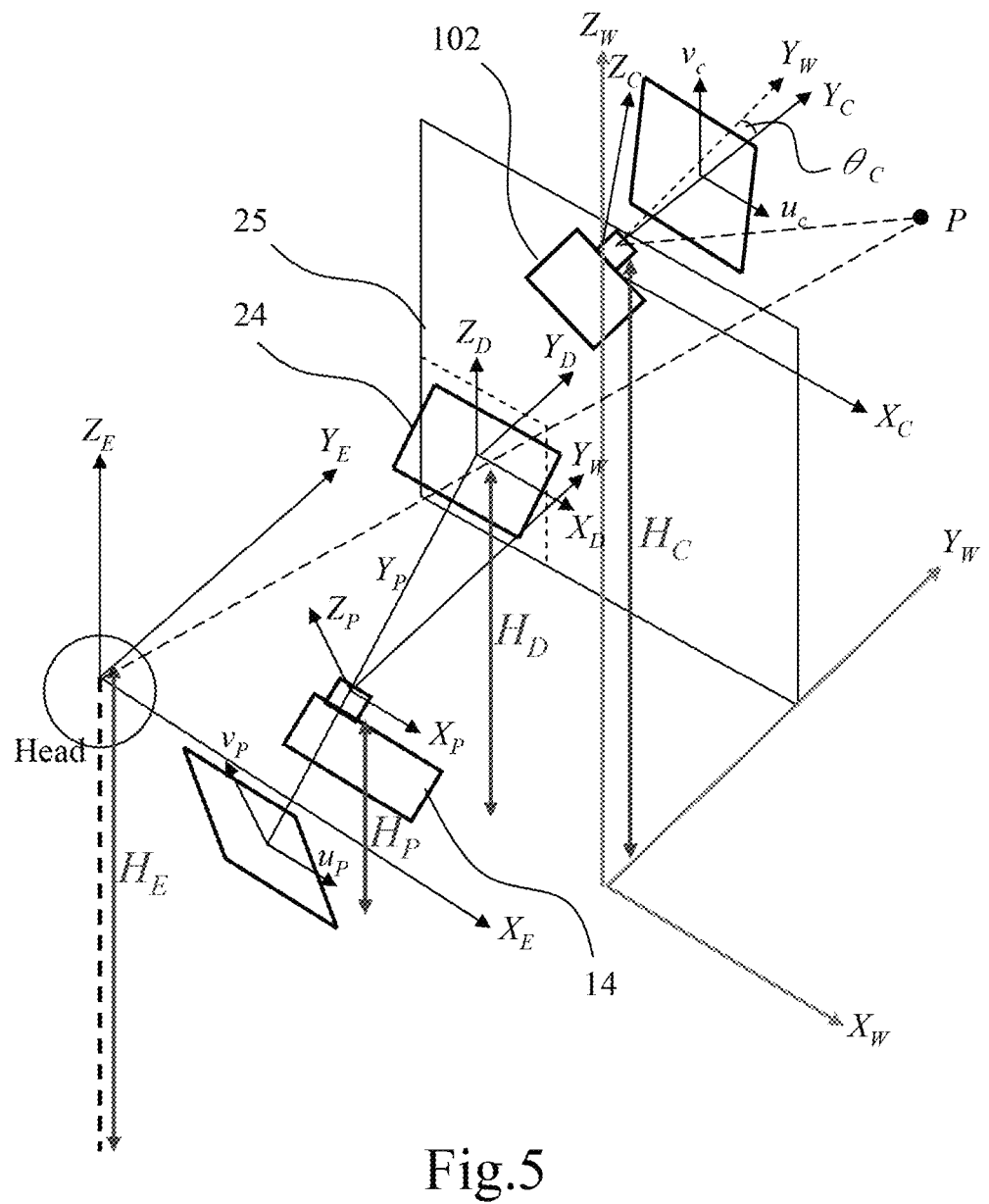
FIG. 5 is a schematic diagram showing multi coordinate transformation according to the present invention.

For the distance from the eyes to the image capturing device 102, and the height from the eyes to the ground, the displacement of eyes in X direction are expressed in a translational matrix $T_{WE3x1}$, while the face rotation angle is expressed in a rotation matrix $R_{WE3x3}$, such that these two matrices represent the position field of view. Then, in step S20, substitute them into an image overlap projection transformation formula. Refer to FIG. 5 and the following equation (2) at the same time:

$$\begin{bmatrix} u_P \\ v_P \\ 1 \end{bmatrix} = t \times A_P \begin{bmatrix} R_{EP3\times3} & T_{EP3\times1} \\ 0_{3\times1} & 1 \end{bmatrix} \begin{bmatrix} R_{WE3\times3} & T_{WE3\times1} \\ 0_{3\times1} & 1 \end{bmatrix} \begin{bmatrix} X_W \\ Z_W \\ Y_W \\ 1 \end{bmatrix}, \quad (2)$$

$$\begin{cases} X_W = \dfrac{u_c H_c}{e_{v_c} m_{\theta_c} - v_c} \cdot \dfrac{e_{v_c}}{e_{u_c}} \\ Y_W = \dfrac{e_{v_c} H_c}{e_{v_c} m_{\theta_c} - v_c} \\ Z_W = \dfrac{m_{\theta_c} e_{v_c} H_c}{e_{v_c} m_{\theta_c} - v_c} \end{cases}$$

Wherein, $u_p$ is the u coordinate (horizontal coordinate) of the display unit 14, $v_p$ is the v coordinate (vertical coordinate) of the display unit 14, $m_{\theta c}$ is the inclination slope of the image capturing device 102 ($\theta c$ is the angle between the image capturing device 102 and the ground), $H_c$ is the height from the image capturing device 102 to the ground, $u_c$ is the image plane u coordinate (horizontal coordinate) of the image capturing device 102, $v_c$ is the image plane v coordinate (vertical coordinate) of the image capturing device 102, $e_{uc}$ is u focal length of the image capturing device 102, and is the distance from the lens of the image capturing device 102 to the image plane u coordinate, $e_{vc}$ is v focal length of the image capturing device 102, and is the distance from the lens of the image capturing device 102 to the image plane v coordinate, t is a parameter of driver's view line, $$t = \frac{-d}{aP_{X_E} + bP_{Y_E} + cP_{Z_E}},$$

wherein, a, b, c, d are display planes D, it can be parameter of viewable panel 24 (as shown in the drawing, the viewable panel coordinates are $X_D, Y_D, Z_D$) or parameter of vehicle windshield 25. $P_{X_E}, P_{Y_E}, P_{Z_E}$ is the position P point in human eye coordinate $(X_E, Y_E, Z_E)$, $(X_W, Y_W, Z_W)$ is a universal coordinate, $A_P$ is an internal parameter of the display unit 14 (such as projection image focal section, optical axis center position), $T_{WE3x1}$ is a translational matrix from the universal coordinate $(X_W, Y_W, Z_W)$ to the human eye coordinate $(X_E, Y_E, Z_E)$, $T_{EP3x1}$ is a translational matrix from the human eye coordinate $(X_E, Y_E, Z_E)$ to a display unit 14 coordinate $(X_P, Y_P, Z_P)$. $R_{WE3x3}$ is a rotation matrix from the universal coordinate $(X_W, Y_W, Z_W)$ to the human eye coordinate $(X_E, Y_E, Z_E)$, and $R_{EP3x3}$ is a rotation matrix from human eye coordinate $(X_E, Y_E, Z_E)$ to display unit 14 coordinate $(X_P, Y_P, Z_P)$.

From the equation (2), it can be known that the position displayed is related to a human face position, other parameters will not be changed with time, only the face position is changed with time, so that if the face position is not substituted into equation (2) real-time to calculate the position to be displayed, then the information seen by human eye can not be overlapped with the actual object. Therefore, after position change of human face, the displayed overlap error correction amount of the coordinate model can be as shown in equation (3). Wherein ($u''_P$, $v''_P$) is the display position obtained through substituting the face position correction parameter $T_{WE3x1}$, $R_{WE3x3}$, t into equation (2); while ($u'_P$, $v'_P$) is the previous display position. Then, subtract the display position ($u''_P$, $v''_P$) obtained through using face position correction parameter from the previous display position ($u'_P$, $v'_P$), to obtain the displayed overlap error correction amount ($e_u$, $e_v$) of the coordinate model:

$$\begin{bmatrix} e_u \\ e_v \\ 1 \end{bmatrix} = \begin{bmatrix} u''_P \\ v''_P \\ 1 \end{bmatrix} - \begin{bmatrix} u'_P \\ v'_P \\ 1 \end{bmatrix} \quad (3)$$

In step S22, upon calculating the position of the display to be projected, the projected display information having the overlapped traffic lane marking of the actual traffic lane and the obstacle in front, namely the new coordinate model, can be obtained. Then, in step S24, utilize the display unit 14 to project the new coordinate model onto a viewable panel 24 or a windshield 25.

In the present invention, the display illumination of display unit can be adjusted depending on it is daytime or nighttime, so that the face image of the driver contains background region. In case the illumination of the background region is less than a threshold value, then the processing unit determines that it is nighttime illumination, so that it adjusts the illumination of the display unit 14. By way of example, suppose the threshold value is 70, and in case the average illumination of the left background block and right background block are both less than 70, then it is determined as nighttime illumination, otherwise, it is determined as daytime illumination. When it is determined as daytime illumination, a high illumination (about over 500) light source is used to display the projected information, and when it is determined as nighttime illumination, a low illumination (about 1.x) light source is used to display the projected information.

Summing up the above, the present invention provides an automatic correction device of a vehicle display system and method thereof, which utilizes a image recognition technology to recognize the face information and environment illumination from the face image of the driver. That is used in cooperation with infrared distance detection to obtain 3D position information of face, so that regardless of movement of driver's view line, the system will automatically adjust and correct the display position real-time. In this approach, the driver is able to view the important display information at any time, without the need to fix his view line to a certain direction, to reduce overlap error of display. In addition, the system is capable of adjusting automatically the display illumination depending on the environment illumination of the light source, so that the driver may obtain important driving information in an intuitive and comfortable manner.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An automatic correction method for a vehicle display system, comprising following steps:
   acquire a coordinate model;
   detect multiple facial features of a driver, utilize a processing unit to calculate face rotation angles and facial features 3-D coordinates of said driver, to estimate a position field of view for said driver looking to front;
   substitute said position field of view into an image overlap projection transformation formula, to generate an overlap error correction parameter; and
   utilize said overlap error correction parameter to correct and update said coordinate model, wherein said facial features of said driver is a face image of said driver obtained through using an image capturing device, that includes face of said driver, positions of nose and eyes, positions of face borders, relative positions of said face borders and said nose, and environment illumination, and wherein said face image of said driver includes a background region, in case illumination of said background region is less than a threshold value, said processing unit determines it is nighttime, and adjusts display illumination of a display unit.

2. The automatic correction method for a vehicle display system as claimed in claim 1, wherein said coordinate model is obtained through capturing at least a front road image, and transforming said front road image into projection display information.

3. The automatic correction method for a vehicle display system as claimed in claim 2, wherein said projection display information is driving information of a traffic lane marking, a front obstacle position, GPS navigation, or vehicle speed, and its projection position.

4. The automatic correction method for a vehicle display system as claimed in claim 1, further comprising: a distance measuring module, to detect distance between said driver and said image capturing device, distance between eyes of said driver and said image capturing device, to obtain height of said eyes to ground, and facial features 3-D coordinates.

5. The automatic correction method for a vehicle display system as claimed in claim 4, wherein said distance measuring module is an infrared distance measuring module.

6. The automatic correction method for a vehicle display system as claimed in claim 1, wherein said face rotation angle is estimated through relative positions of nose and face left and right borders in said facial features obtained by technologies of facial image recognition.

7. The automatic correction method for a vehicle display system as claimed in claim 1, further comprising: project said coordinate model to a front of said driver, so that projection position of said coordinate model overlaps said position field of view of said driver.

8. The automatic correction method for a vehicle display system as claimed in claim 7, wherein said coordinate model is projected onto a windshield of said vehicle, a reflective optical film glued onto said windshield, or a viewable panel.

9. The automatic correction method for a vehicle display system as claimed in claim 1, wherein said coordinate model is a coordinate projection transformation matrix.

10. An automatic correction device of a vehicle display system, installed on a vehicle, comprising:
    an information capturing unit, used to fetch multiple facial features of a driver and distance between face of said driver and an image capturing device;
    a processing unit, used to calculate face rotation angles and facial features 3-D coordinates of said driver, based on said facial features and said distance obtained by said information capturing unit, to estimate a position field of view for said driver looking to front, and generate an overlap error correction parameter based on said position field of view, to correct a coordinate model; and
    a display unit, used to project said corrected coordinate model to front of said driver, so that position of said projected coordinate model overlaps said position field of view of said driver, wherein said facial features of said driver is a facial image of said driver obtained through using an image capturing device, that includes face of said driver, positions of nose and eyes, positions of face borders relative positions of said face borders and said nose, and environment illumination, and wherein the facial image of said driver includes a background region, in case illumination of said background region is less than a threshold value, said processing unit determines it is nighttime, and adjusts display illumination of said display unit.

11. The automatic correction device of a vehicle display system as claimed in claim 10, wherein said information capturing unit includes said image capturing device and a distance measuring module, to capture face information and measure distance between face of said driver and said image capturing device respectively.

12. The automatic correction device of a vehicle display system as claimed in claim 11, wherein said distance measuring module is an infrared distance measuring module.

13. The automatic correction device of a vehicle display system as claimed in claim 10, wherein said facial features 3-D coordinate includes distance between eyes of said driver and said image capturing device, height of said eyes to ground, and said face rotation angle.

14. The automatic correction device of a vehicle display system as claimed in claim 10, wherein said face rotation angle is estimated through relative positions of nose and face left and right borders in said facial features obtained by means of technologies of facial image recognition.

15. The automatic correction device of a vehicle display system as claimed in claim 10, wherein said coordinate model is obtained through capturing at least a front road image, and transforming said front road image into projection display information.

16. The automatic correction device of a vehicle display system as claimed in claim 10, wherein said coordinate model is projected onto a windshield of said vehicle, a reflective optical film glued onto said windshield, or a viewable panel.

* * * * *